United States Patent
Mokerji

Patent Number: 6,103,381
Date of Patent: *Aug. 15, 2000

[54] COATING HAVING THE APPEARANCE OF BLACK CHROME WITH A SILICONE TOP LAYER

[75] Inventor: Subrata Mokerji, Shelby Township, Mich.

[73] Assignee: MascoTech, Inc., Taylor, Mich.

[*] Notice: This patent is subject to a terminal disclaimer.

[21] Appl. No.: 08/905,204

[22] Filed: Aug. 1, 1997

[51] Int. Cl.[7] ...................................................... B32B 15/04
[52] U.S. Cl. ........................ 428/412; 428/447; 428/458; 428/461; 428/462; 428/463
[58] Field of Search ..................................... 428/412, 457, 428/458, 461, 462, 463, 447

[56] References Cited

U.S. PATENT DOCUMENTS

| | | | |
|---|---|---|---|
| 3,838,512 | 10/1974 | Sanderson | 30/346.54 |
| 3,977,839 | 8/1976 | Palisin, Jr. | 428/626 |
| 4,109,052 | 8/1978 | Anderson | 428/409 |
| 4,148,967 | 4/1979 | Satoh et al. | 428/416 |
| 4,305,981 | 12/1981 | Muroi et al. | 428/31 |
| 4,321,299 | 3/1982 | Frosch et al. | 442/379 |
| 4,369,225 | 1/1983 | Manabe et al. | 428/334 |
| 4,374,717 | 2/1983 | Drauglis et al. | 204/192.14 |
| 4,911,811 | 3/1990 | Mullaney, Jr. | 204/192.14 |
| 4,931,366 | 6/1990 | Mullaney, Jr. | 428/622 |
| 5,510,164 | 4/1996 | Best | 428/641 |
| 5,589,280 | 12/1996 | Gibbons | 428/626 |
| 5,656,335 | 8/1997 | Schwing et al. | 427/447 |

*Primary Examiner*—Leszek Kiliman
*Attorney, Agent, or Firm*—Myron B. Kapustij; Lloyd D. Doigan

[57] ABSTRACT

An article is coated with a multi-layer coating comprising a polymeric layer deposited on the surface of the article, a chrome/nickel alloy layer deposited on the polymeric layer, and a silicone resin layer deposited on the chrome/nickel alloy layer.

11 Claims, 1 Drawing Sheet

COATING HAVING THE APPEARANCE OF BLACK CHROME WITH A SILICONE TOP LAYER

FIELD OF THE INVENTION

The instant invention relates to a substrate having a leveling polymeric coating thereon, a decorative chrome/nickel alloy layer on the polymeric coating, and a protective silicone coating over the chrome/nickel alloy layer.

SUMMARY OF THE INVENTION

In accordance with this invention a polymeric basecoat is provided on the surface of the substrate. The polymeric basecoat provides a leveling effect to the surface of the substrate. A decorative chrome layer is then applied onto the basecoat. A silicone resin top coat is provided over the chrome layer. This top coat functions both as a protective coating for the underlying chrome/nickel alloy layer and to provide the appearance of black chrome to the coated chrome/nickel alloy layer.

BACKGROUND OF THE INVENTION

Thin chrome layers have been applied by electroplating or vapor deposition onto the surfaces of various substrates to provide a decorative and shiny appearance thereto. However, the substrates have had to be pretreated as by polishing, cleaning and the like to remove any scratches or other imperfections from their surfaces before the chrome layer is applied thereon. Otherwise, the chrome layer will enhance and accentuate these imperfections. Also, the chrome layer is subject to abrasion, scratching and weathering, particularly if it is applied onto a part of a vehicle such as, for example, a wheel cover.

The present invention provides a substrate with a decorative and protective coating having the appearance of black chrome which is not subject to the afore-mentioned disadvantages.

DESCRIPTION OF THE PREFERRED EMBODIMENT

Figure 1:
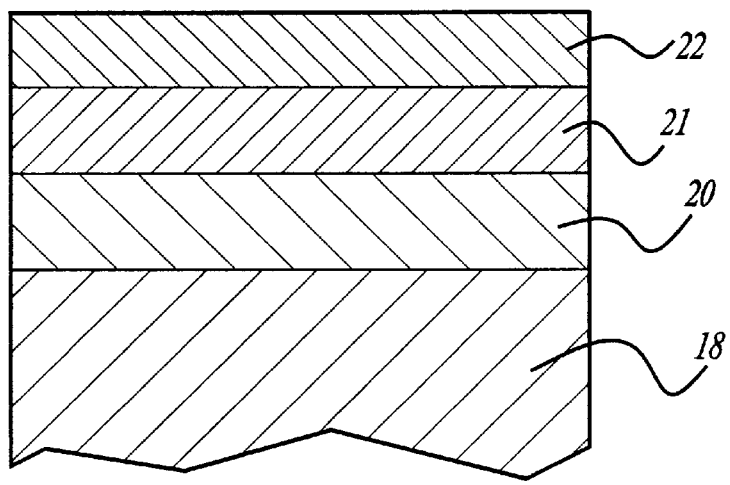
FIG. 1 is a cross-sectional view, not to scale of a portion of the substrate having the multi-layer coating on its surface.
Figure 2:
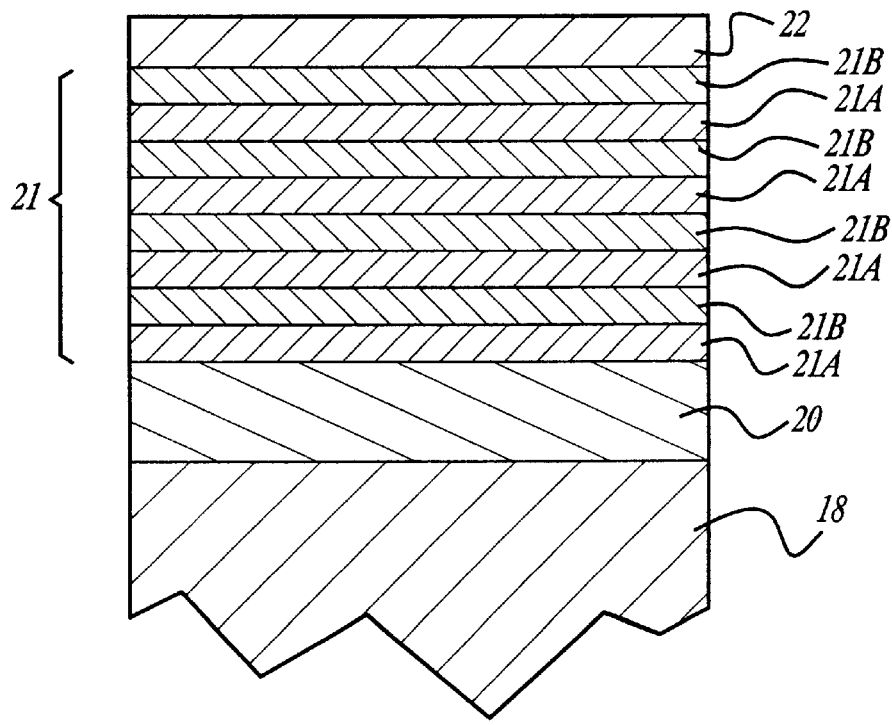
FIG. 2 is a cross-sectional view, not to scale, of a portion of the substrate and coating showing another embodiment of the multi-layer coating.

The article or substrate 18 can be comprised of any suitable material such as plastic, ceramic, metal or metal alloy. The metals include nickel, aluminum, copper, steel and zinc. The metal alloys include nickel alloys and brass. The plastics forming the substrate include polycarbonates, nylon, acrylonitrile-butadiene-styrene, polyesters, polyvinylchlorides, and the like. In one embodiment the article is part of a vehicle, such as for example, a wheel cover.

Over the surface of the substrate 18 is deposited a polymeric or resinous layer 20. The polymeric or resinous layer or basecoat 20 may be comprised of both thermoplastic and thermoset polymeric or resinous material. These polymeric or resinous materials include the well known, conventional and commercially available polycarbonates, polyacrylates, polymethacrylates, nylons, polyesters, polypropylenes, polyepoxies, alkyds and styrene containing polymers such as polystyrene, styrene-acrylonitrile (SAN), styrene-butadiene, acrylonitrile-butadiene-styrene (ABS), and blends and copolymers thereof.

The polycarbonates are described in U.S. Pat. Nos. 4,579,910 and 4,513,037, both of which are incorporated herein by reference.

Nylons are polyamides which can be prepared by the reaction of diamines with dicarboxylic acids. The diamines and dicarboxylic acids which are generally utilized in preparing nylons generally contain from two to about 12 carbon atoms. Nylons can also be prepared by additional polymerization. They are described in "Polyamide Resins", D. E. Floyd, Reinhold Publishing Corp., N.Y. 1958, which is incorporated herein by reference.

The polyepoxies are disclosed in "Epoxy Resins", by H. Lee and K. Neville, McGraw-Hill, N.Y., 1957, and in U.S. Pat. Nos. 2,633,458; 4,988,572; 4,680,076; 4,933,429 and 4,999,388, all of which are incorporated herein by reference.

The polyesters are polycondensation products of an aromatic dicarboxylic acid and a dihydric alcohol. The aromatic dicarboxylic acids include terephthalic acid, isophthalic acid, 4,4'-diphenyl-dicarboxylic acid, 2,6-naphthalenedicarboxylic acid, and the like. Dihydric alcohols include the lower alkane diols with from two to about 10 carbon atoms such as, for example, ethylene glycol, propylene glycol, cyclohexanedimethanol, and the like. Some illustrative non-limiting examples of polyesters include polyethylene terephthalate, polybutylene terephthalate, polyethylene isophthalate, and poly(1,4-cyclohexanedimethylene terephthalate). They are disclosed in U.S. Pat. Nos. 2,465,319; 2,901,466 and 3,047,539, all of which are incorporated herein by reference.

The polyacrylates and polymethacrylates are polymers or resins resulting from the polymerization of one or more acrylates such as, for example, methyl acrylate, ethyl acrylate, butyl acrylate, 2-ethylhexyl acrylate, etc., as well as the methacrylates such as, for instance, methyl methacrylate, ethyl methacrylate, butyl methacrylate, hexyl methacrylate, etc. Copolymers of the above acrylate and methacrylate monomers are also included within the term "polyacrylates or polymethacrylates" as it appears herein. The polymerization of the monomeric acrylates and methacrylates to provide the polyacrylate resins useful in the practice of the invention may be accomplished by any of the well known polymerization techniques.

The styrene-acrylonitrile and acrylonitrile-butadiene-styrene resins and their preparation are disclosed, inter alia, in U.S. Pat. Nos. 2,769,804; 2,989,517; 2,739,142; 3,991,136 and 4,387,179, all of which are incorporated herein by reference.

The alkyd resins are disclosed in "Alkyd Resin Technology", Patton, Interscience Publishers, NY, N.Y., 1962, and in U.S. Pat. Nos. 3,102,866; 3,228,787 and 4,511,692, all of which are incorporated herein by reference.

These polymeric materials may optionally contain the conventional and well known fillers such as mica, talc and glass fibers.

The polymeric layer or basecoat 20 may be applied onto the surface of the substrate by any of the well known and conventional methods such as dipping, spraying and brushing.

The polymeric layer 20 functions, inter alia, to level the surface of the substrate, cover any scratches or imperfections in the surface and provide a smooth and even surface for the deposition of the chrome layer.

The polymeric layer 20 has a thickness at least effective to level out the surface of the substrate. Generally, this thickness is from about 0.1 mil to about 10 mils, preferably from about 0.2 mil to about 5 mils, and more preferably from about 0.3 mil to about 1.5 mils.

The chrome/nickel alloy layer 21 may be deposited on the polymeric layer 20 by any of the conventional and well known chrome/nickel alloy deposition techniques including vapor deposition such as physical vapor deposition and electroplating techniques. The electroplating techniques along with various chrome plating baths are disclosed in Brassard, "Decorative Electroplating—A Process in Transition", Metal Finishing, June 1988; Zaki, "Chromium Plating", PF Directory; and in U.S. Pat. Nos. 4,460,438, 4,234,396 and 4,093,522, all of which are incorporated herein by reference.

Chrome/nickel alloy plating baths are well known, conventional and commercially available. A typical chrome/nickel plating bath contains chromic acid or salts thereof, and catalyst ion such as sulfate or fluoride. The catalyst ions can be provided by sulfuric acid or its salts and fluosilicic acid. The baths may also contain nickel sulfate, nickel chloride and boric acid. These baths can include a number of well known and conventionally used compounds such as leveling agents, brighteners and the like. The baths may be operated at a temperature of about 112°–116° F. Typically in chrome/nickel plating a current density of about 150 amps per square foot, at about five to nine volts is utilized.

The vapor deposition of the chrome/nickel alloy is conventional and well known in the art and includes techniques such as cathodic arc evaporation (CAE) or sputtering. Sputtering techniques and equipment are disclosed, inter alia, in J. Vossen and W. Kern "Thin film Processes II", Academic Press, 1991; R. Boxman et al, "Handbook of Vacuum Arc Science and Technology", Noyes Pub., 1995; and U.S. Pat. Nos. 4,162,954 and 4,591,418, all of which are incorporated herein by reference.

Briefly, in the sputtering deposition process a metal (i.e., chrome/nickel alloy) target, which is the cathode, and the substrate are placed in a vacuum chamber. The air in the chamber is evacuated to produce vacuum conditions in the chamber. An inert gas, such as Argon, is introduced into the chamber. The gas particles are ionized and are accelerated to the target to dislodge chrome and nickel atoms. The dislodged target material is then typically deposited as a coating film on the substrate.

In cathodic arc evaporation, an electric arc of typically several hundred amperes is struck on the surface of a metal cathode such as chrome/nickel alloy. The arc vaporizes the cathode material, which then condenses on the substrates forming a coating.

The chrome/nickel alloy which comprises layer 21 generally contains, in percent by weight, from about 5% to about 95% nickel and from about 95% to about 5% chrome, preferably from about 50% to about 90% nickel and from about 10% to about 50% chrome, and more preferably from about 70% to about 90% nickel and from about 10% to about 30% chrome.

The thickness of the chrome/nickel alloy layer 21 is at least a thickness effective to provide a decorative appearance to the article. Generally this thickness is from about 200 Angstroms to about 37.5 microns, preferably from about 400 Angstroms to about 5,000 Angstroms.

Over the chrome/nickel alloy layer 21 is applied a silicone resin top coat 22. The silicone resins or organopolysiloxanes which are utilized in the instant invention are conventional, well known and generally commercially available. They are disclosed, inter alia, in U.S. Pat. Nos. 3,375,223; 3,435,001; 3,450,672; 3,790,527; 3,832,319; 3,865,766; 3,888,815; 3,887,514; 3,925,276; 3,986,997; and 4,027,073, the disclosures of which are incorporated herein by reference.

The silicone resin is applied from a top coat composition containing a further-curable organopolysiloxane and, generally, solvents for the further curable organopolysiloxane. The top coat composition may be applied by standard and conventional techniques such as spraying, brushing, etc. over the chrome layer.

To cure the further curable organopolysiloxane and form the silicone resin top coat the top coat composition is then heated at a temperature and for a time effective to cure said further curable organopolysiloxane.

One particular class of further curable organopolysiloxanes which are employed in the top coat compositions of the present invention are the partial hydrolysis and condensation products of alkoxy functional silanes, preferably alkyltrialkoxysilanes, preferably those alkyltrialkoxysilanes wherein the alkyl group contains from 1 to about 8 carbon atoms, and aryltrialkoxysilanes, preferably phenyltriakoxysilanes, or mixtures thereof, wherein the alkoxy group contains from 1 to about 8 carbon atoms, such as, for example, methoxy, ethoxy, isopropoxy, butoxy, pentoxy, hexoxy, octoxy, and the like. These further-curable organopolysiloxanes are generally prepared by a process wherein the alkyltrialkoxysilane and aryltrialkoxysilane is heated in the presence of water, wherein the molar ratio of water to total silane is at least about 1.5:1 and in the presence of an effective amount of a hydrolysis catalyst, such as a mineral acid, for example, HCl, for about 1 to about 10 hours at a temperature between ambient and reflux to produce a siloxane partial condensation product; the partial condensation product is then concentrated by heating to remove 50 to about 90 mole percent alkanol by-product and some water, and thereafter, the concentrated partial condensation product is precured by heating at a temperature below the gel point thereof and generally in the range of about 70° to 300° C. to produce the solvent-soluble, further curable organopolysiloxane. This precured solvent-soluble, further curable organopolysiloxane is then dissolved in a suitable solvent to form the top-coat composition and the chrome layer 21 is then coated with this top coat composition. The solvent is then evaporated and the residual further curable organopolysiloxane is cured to a thermoset state to provide a top coat. The curing is effected at elevated temperatures in the range of about 50° to 135° C. for times between about 1 hour to about 72 hours, depending on the temperature at which the cure is effected. The silicone top coat generally should be cured preferably at an elevated temperature to effect the proper cure.

One particular further curable organopolysiloxane that can be employed in the top coat composition of the instant invention is the partial hydrolysis and condensation product of methyltriethoxysilane. This further curable organopolysiloxane is prepared by hydrolyzing methyltriethoxysilane with water in the presence of an effective amount of a hydrolysis catalyst, such as HCl, for about 1 to 10 hours at a temperature generally between 40° C. and reflux temperature, to product a partial condensation product. This partial condensation product is then concentrated by heating to remove some of the alkanol by-product and water. This concentrated product is then partially pre-cured at a temperature of about 70° to about 300° C. and below the gel point thereof and then solidified to provide a solid, solvent-soluble, further curable organopolysiloxane is then dissolved to a desired concentration in a suitable solvent to form the top coat composition. The top coat composition is then applied to the primed polycarbonate substrate, after which the solvent is evaporated and the further curable organopolysiloxane finally cured to provide a hard, abrasion and chemical solvent resistant, thermoset organopolysiloxane top coat on the polycarbonate substrate.

Another further curable organopolysiloxane which may be employed in the practice of the present invention is the partial hydrolysis and condensation product of a mixture of methyltriethoxysilane and phenyltriethoxysilane. This organopolysiloxane is prepared by hydrolyzing a mixture of methyltriethoxysilane and phenyltriethoxysilane with water in the presence of a hydrolysis catalyst such as HCl to produce a partial condensation product. This partial condensation product is then concentrated by heating to remove a substantial amount of the alkanol by-product and some water. This concentrated product is then partially pre-cured by heating and then solidified to provide a solid, solvent-soluble, further curable organopolysiloxane. The solid, solvent-soluble, further curable organopolysiloxane is then dissolved to a desired concentration in a suitable solvent to form the top coat composition containing a further curable organopolysiloxane. The top coat composition is then applied to the primed polycarbonate substrate, after which the solvent is evaporated and the further curable organopolysiloxane is finally cured to provide a tenaciously and durably adhered, abrasion and chemical resistant thermoset organopolysiloxane top coat on the polycarbonate substrate.

These are not the only silicones that may be utilized in the top coats of the instant invention. Also useful are silicone resins composed of trifunctional and difunctional units, silicone resins composed of trifunctional units, difunctional units and tetrafunctional units where the organo substituent groups in the trifunctional units may be selected from hydrocarbon radicals of 1 to about 8 carbon atoms and are preferably methyl, phenyl and vinyl; and wherein the organo substituent groups in the difunctional siloxy units may be selected from hydrocarbon units of from 1 to about 8 carbon atoms, preferably alkyl radicals, vinyl radicals and phenyl radicals. Such silicone resins usually have an organic to silicone atom ratio of 1:1 to 1.9:1, may have a silanol content that varies anywhere from 4 to 10 weight percent and optionally may have an alkoxy content that varies from 2 to 4%. The preparation of such silicone resins which may be utilized as top coats in the invention of the instant case are, for instance, to be found in U.S. Pat. Nos. 3,375,223; 3,435,001; 3,450,672; 3,790,527; 3,832,319; 3,865,766; 3,887,514 and 3,925,276.

These silicones may also contain fillers such as, for example, glass, talc and silica, preferably colloidal silica.

The coating compositions containing the afore-described silicones are simply brushed, dipped, sprayed or flowed on top of the primer layer that is applied to the polycarbonate substrate. The solvent, or alcohol by-product and water, present in the top coat composition is evaporated and the residual further curable organopolysiloxane is cured to form a thermoset organopolysiloxane top coat. Preferably, the further curable organopolysiloxane is cured at elevated temperatures. Although certain catalysts may be utilized to accelerate the cure of the further curable organopolysiloxane, such catalysts are not necessary if the further curable organopolysiloxane is cured by itself at the elevated temperature for a sufficient length of time.

The silicone resin layer 22 can also be applied by well known, standard and conventional chemical vapor deposition, particularly plasma enhanced chemical vapor deposition, processes and physical vapor deposition sputtering processes.

Chemical vapor deposition (CVD) is defined as the formation of a non-volatile solid film on a substrate by the reaction of vapor phase reactants that contain desired components. The gases are introduced into a reactor vessel, and decompose and react at a heated surface on the substrate to form the desired film.

CVD is generally classified into one of three types. The first two are principally predicated upon reactor pressure, and are designated as atmospheric pressure chemical vapor deposition (APCVD) or low pressure chemical vapor deposition (LPCDV).

A third category is referred to as plasma enhanced chemical vapor deposition (PECVD). Rather than relying solely on thermal energy to initiate and sustain chemical reactions, PECVD uses a radio frequency (RF) induced glow discharge or direct current or microwaves to transfer energy into the reactant gases, allowing the substrate to remain at lower temperature than in APCVD or LPCVD processes. Specifically, the plasma-inducing glow discharge is generated by the application of an RF field to a low pressure gas, thereby creating free electrons within the discharge region. The electrons gain sufficient energy from the electric field so that when they collide with gas molecules, gas-phase dissociation and ionization of the reactant gases (i.e., inducement into the plasma state) then occurs. Lower substrate temperature is the major advantage of PECVD, and provides a method of depositing films on some substrates which do not have the thermal stability to accept coating by other methods. In addition, PECVD can enhance the deposition rate when compared to thermal reactions alone, and produces films of unique compositions and properties.

Plasma enhanced chemical vapor deposition processes and reactors are disclosed, inter alia, in U.S. Pat. Nos. 5,646,435; 5,646,050; 4,888,199; 5,628,829; 5,643,364 and 5,628,869, all of which are incorporated herein by reference.

Upon the application of the silicone layer 22 on the chrome/nickel alloy layer 21, layer 21 assumes the appearance of black chrome, i.e., a deep, lustrous, dark, shiny appearance. Absent layer 22 the chrome/nickel layer 21 does not have the appearance of black chrome. Thus, layer 22 serves the dual function of protecting layer 21 and giving it the appearance of black chrome.

The thickness of the silicone resin layer is a thickness at least effective to protect the underlying chrome/nickel alloy layer from scratching, abrasion and corrosion, and to give it the appearance of black chrome, i.e., a dark, lustrous and shiny appearance. Generally this thickness is from about 0.05 mil to about 5 mils, preferably from about 0.1 mil to about 3 mils, and more preferably from about 0.2 mil to about 1 mil.

In certain situations the silicone top coat may not adhere sufficiently well to the chrome layer. In such cases a primer layer may optionally be applied onto the chrome layer and the silicone top coat applied over the primer layer. Polyacrylates and polymethacrylates are useful as primer layers.

In order that the invention may be more readily understood the following example is provided. The example is illustrative and does not limit the invention thereto.

EXAMPLE 1

A steel substrate is ultrasonically cleaned and then heated at 250° F. to remove moisture. A basecoat polymeric composition is applied onto the cleaned and dried steel substrate by a standard and conventional high volume low pressure gun. The polymer is comprised of 35 weight percent styrenated acrylic resin, 30 weight percent melamine formaldehyde resin, and 35 weight percent bisphenol A epoxy resin. The polymer is dissolved in sufficient solvents to provide a polymeric composition containing about 43 weight percent solids. After the basecoat is applied onto the substrate the substrate is allowed to sit for 20 minutes for ambient solvent flash off. The substrate is then baked at 375° F. for two hours. The resulting cured polymeric basecoat has a thickness of about 0.8 mil.

The basecoated substrate is placed on a metallizing rack. The metallizing rack is placed in a metallizing carriage which is placed inside a vacuum chamber. The chamber is evacuated to a vacuum level of 5×10E-5 torr. The metallizing carriage has two bus bars which hold 40 tungsten filaments. Each tungsten filament holds one nickel/chrome alloy (77 weight percent Ni, 16 weight percent Cr and 7 weight percent Fe) slugs. Electric power is fed to the bus bars to resistively heat the tungsten filaments. The nickel/chrome alloy slugs are melted, evaporate, and the nickel/chrome alloy condenses on the coated rotating substrate. The deposited nickel/chrome alloy layer has a thickness of 400 Angstroms.

The application of electric power is terminated, the chamber is allowed to cool and the metallizing carriage is removed from the vacuum chamber.

A primer composition is applied by spraying over the nickel/chrome alloy layer. The primer composition comprises a polymethylmethacrylate resin dissolved in solvents. The primer composition contains two weight percent solids. After the solvents are evaporated from the primer composition and the primer composition is allowed to dry a silicone top coat composition containing a silicone resin dissolved in organic solvents is sprayed over the polymethylmethacrylate primer layer. The silicone top coat composition has 20 weight percent solids and the solvents include methanol, diacetone alcohol and iso-butanol. The silicone resin is a commercially available, conventional and well known resin prepared by cohydrolyzing organochlorosilane mixtures such as methylchlorosilane, ethylchlorosilane to form resin intermediates high in silanol groups. The resin intermediate is condensed to form a complex polysiloxane polymer. An ultraviolet light inhibitor is added to the resin to protect the resin from yellowing due to exposure to ultraviolet radiation. The resin coated substrate is then baked at 260° F. for one hour to evaporate off the solvents and cure and crosslink the resin. The resultant silicone resin has a dry thickness of seven microns.

The coated substrate has the appearance of black chrome and has improved resistance to abrasion and corrosion.

While certain embodiments of the invention have been described for purposes of illustration, it is to be understood that there may be other additional various embodiments and modifications within the general scope of the invention.

I claim:

1. An article having on at least a portion of its surface a multi-layer coating comprising:

a layer comprised of polymeric material on at least a portion of the surface of said article;

a non-transparent layer comprised of chrome and nickel alloy directly on said layer comprised of polymeric material; and a top layer comprised of organopolysiloxane on said layer comprised of chrome and nickel alloy.

2. The article of claim 1 wherein said organopolysiloxane is a silicone resin.

3. The article of claim 1 wherein said polymeric material is selected from polycarbonate, polyacrylate, polymethacrylate, polyester, acrylonitrile-butadiene-styrene, nylon, polystyrene, styrene-butadiene, styrene-acrylonitrile, and blends and copolymers thereof.

4. The article of claim 2 wherein said polymeric material is selected from polycarbonate, polyester, polyacrylate, polymethacrylate, acrylonitrile-butadiene -styrene, nylon, polystyrene, styrene-acrylonitrile, and blends and copolymers thereof.

5. The article of claim 1 wherein said article is comprised of plastic.

6. The article of claim 1 wherein said organopolysiloxane is a silicone resin.

7. The article of claim 2 wherein said organopolysiloxane is a silicone resin.

8. The article of claim 1 wherein a primer layer is disposed intermediate said layer comprised of organopolysiloxane and said layer comprised of chrome/nickel alloy.

9. The article of claim 2 wherein said primer layer is comprised of plyacrylate or polymethacrylate.

10. An article comprised of metal or metal alloy having on at least a portion of its surface a multi-layer coating comprising:

a layer comprised of polymeric material selected from the group consisting of polycarbonate, polyepoxy, polyester, alkyd, polyacrylate, polymethacrylate, acrylonitrile-butadiene-styrene, nylon, polystyrene, styrene-butadiene, styrene-acrylonitrile, polypropylene, and blends and copolymers thereof on at least a portion of the surface of said article;

a non-transparent layer comprised of chrome and nickel alloy directly on said layer comprised of polymeric material; and a top layer comprised of organopolysiloxane on said layer comprised of chrome and nickel alloy.

11. An article having on at least a portion of its surface a multi-layer coating comprising:

a layer comprised of polymeric material selected from the group consisting of polycarbonate, polyacrylate, polyester, polymethacrylate, nylon, alkyd, polyepoxy, acrylonitrile-butadiene-styrene, polystyrene, styrene-butadiene, styrene-acrylonitrile, polypropylene, and blends and copolymers thereof on at least a portion of the surface of said article;

a non-transparent layer comprised of chrome and nickel alloy directly on said layer comprised of polymeric material; and a top layer comprised of organopolysiloxane on said layer comprised of chrome and nickel alloy.

* * * * *